United States Patent [19]

Holdredge et al.

[11] Patent Number: 4,939,582

[45] Date of Patent: Jul. 3, 1990

[54] CONVERTIBLE VISUAL DISPLAY DEVICE

[76] Inventors: Terry K. Holdredge; Susan S. Holdredge, both of 1303 Hanover Rd., Anderson, S.C. 29621

[21] Appl. No.: 34,691

[22] Filed: Apr. 6, 1987

[51] Int. Cl.⁵ ............ H04N 5/64

[52] U.S. Cl. ............ 358/254; 5/93 R; 5/113; 5/100; 358/93; 434/307; 434/432

[58] Field of Search ............ 358/254, 255, 93, 108, 358/249; 434/307, 432; 5/512, 93 R, 113, 100, 414, 93 B; 297/184, 217; 600/21, 22; 128/897, 849

[56] References Cited

U.S. PATENT DOCUMENTS 3,233,346 2/1966 Cornberg ............ 434/307
4,260,376 4/1981 Litel et al. ............ 358/93
4,607,401 8/1986 Sisson ............ 5/414
4,681,195 7/1987 Trahan et al. ............ 5/414
4,725,106 2/1988 Shields et al. ............ 312/7.2

FOREIGN PATENT DOCUMENTS 2215750 11/1972 Fed. Rep. of Germany ...... 297/217

*Primary Examiner*—Edward L. Coles, Sr.
*Assistant Examiner*—Jerome Grant
*Attorney, Agent, or Firm*—Cort Flint

[57] ABSTRACT

A convertible audio-visual display center adapted to reproduce visual images on a video display unit such as a television and audio reproductions of sound or music for the entertainment and/or education of infants in their cribs. The same device is readily convertible to usage as a work station for a computer console with simple adjustments.

26 Claims, 4 Drawing Sheets

*Fig. 1.*
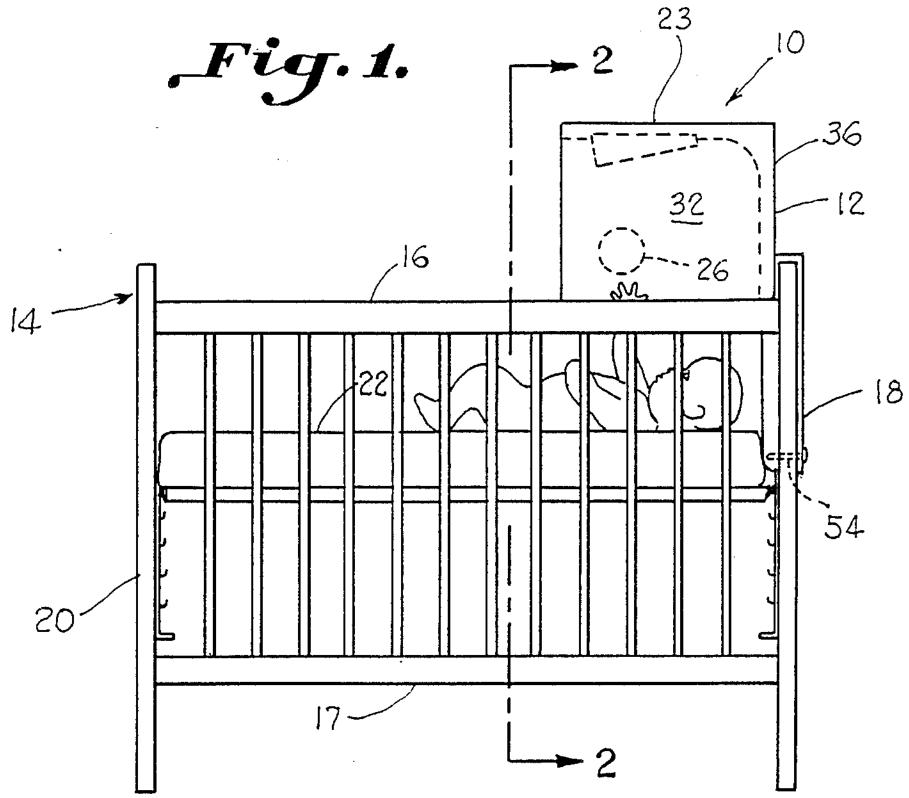
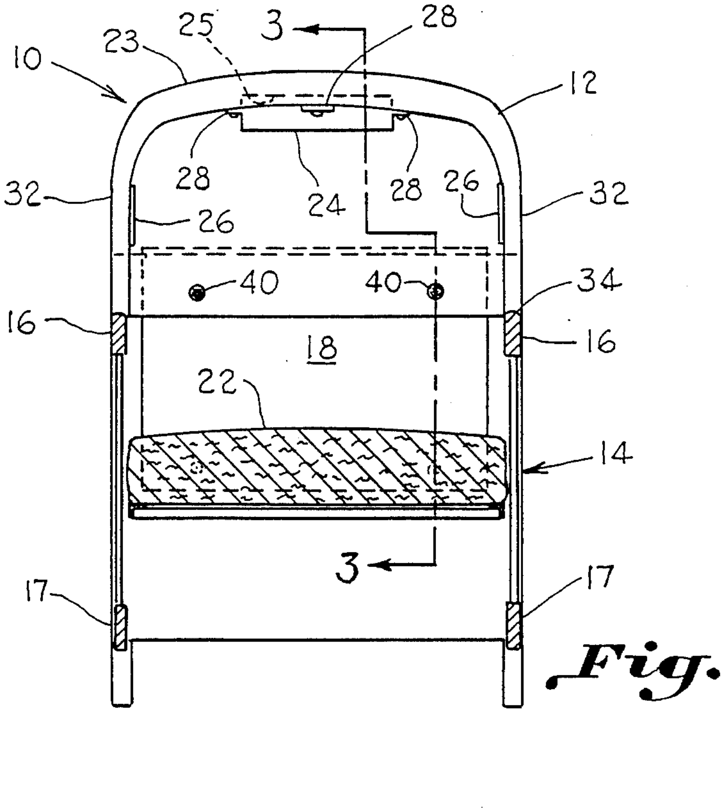
*Fig. 2.*

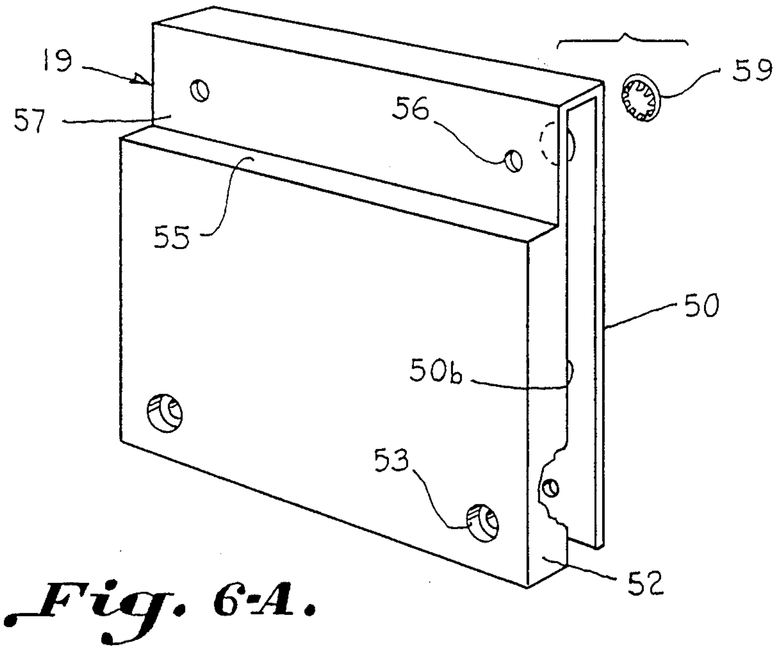
*Fig. 6-A.*
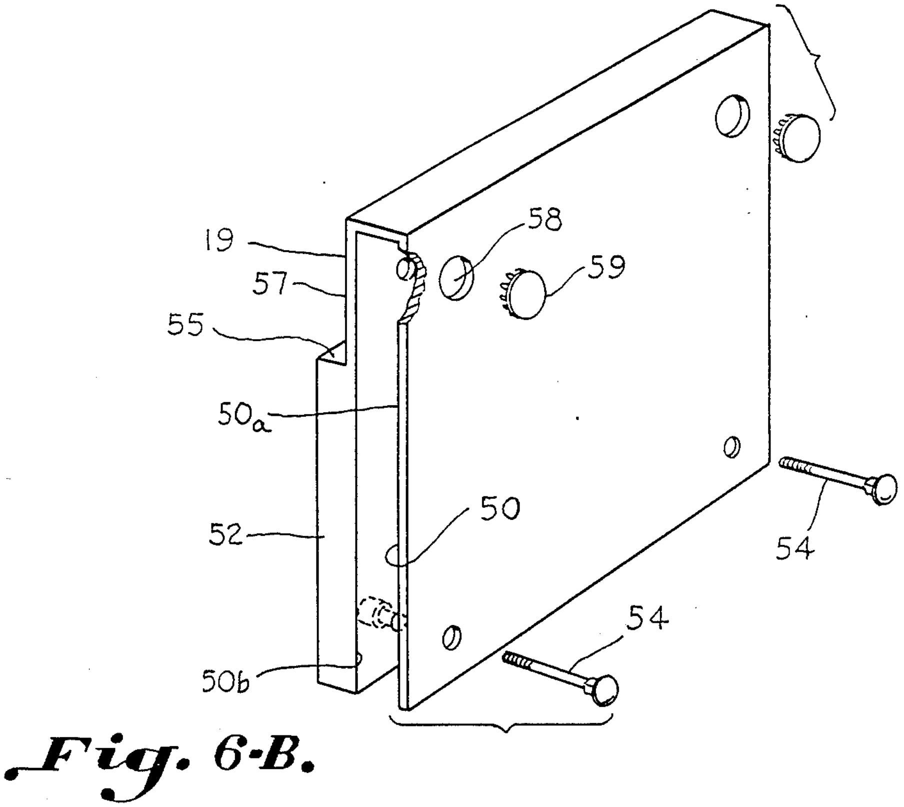
*Fig. 6-B.*

CONVERTIBLE VISUAL DISPLAY DEVICE

BACKGROUND OF THE INVENTION

This invention relates to a convertible audio-visual display device. It is particularly related to a device which will mount on the baby's crib and provide audio and visual stimulation for the baby for entertaining and educating the baby. The unit converts to a useful, computer station by means of simple adjustments to permit the parents or others to utilize the device with a home or personal computer or word processor.

In the past, television cameras have been used to monitor infants, patients, prisoners, and the like and mothers have permitted their older children to watch television and the like to entertain them when they were older. However, nothing has been done to entertain and to stimulate younger children, for example, infants who are confined to cribs.

SUMMARY OF THE INVENTION

In the instant invention a canopy is provided which has an end wall, a top horizontal wall, and two side walls with the bottom and the front walls being open. The canopy is adapted to be securely mounted on the crib so as to provide secure means for fastening said canopy to the crib so that the canopy lies over where the baby normally rests. The top wall of the canopy (when the canopy is in place on the crib) is provided with a recess for mounting and supporting an audio-visual unit. The side walls of the canopy are adapted to receive, and to support, speaker means.

When the canopy is removed from the crib it is adapted for its end wall to rest on a table top or desk top or the like and to, in turn, support a computer or word processing console.

It is an object of the invention to provide a convertible audio-visual device which serves the multi-function of entertaining young babies either audibly or visually or in combination.

It is another object of the invention to provide an audio-visual device which can support and compliment a computer console with a single adjustment of the device.

These and other objects will become apparent when reading the attached specification in conjunction with the drawings appended thereto.

BRIEF DESCRIPTION OF THE DRAWINGS

The construction designed to carry out the invention will hereinafter be described, together with other features thereof.

The invention will be more readily understood from a reading of the following specification and, by reference to the accompanying drawings forming a part thereof, wherein an example of the invention is shown, and wherein:

FIG. 1 is a side elevation of a crib showing the canopy of the invention in place thereon;

FIG. 2 is a cross-sectional view taken along lines 2—2 of FIG. 1;

FIG. 6A is a front perspective view of the adapter for supporting the canopy securely on the headboard of the crib;

FIG. 6B is a rear perspective view of the adapter for supporting the canopy securely on the headboard of the crib;

DETAILED DESCRIPTION OF THE INVENTION

Figure 5:
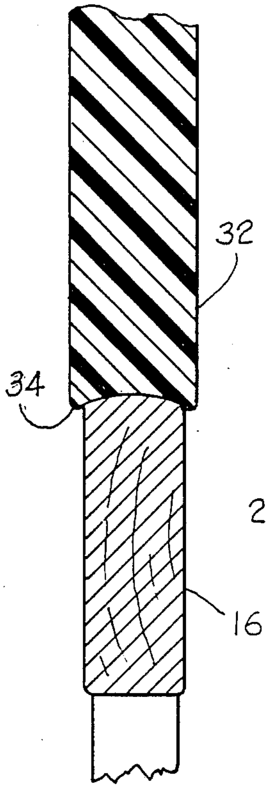
FIG. 5 is an enlarged cross-sectional view showing one of the side walls of the canopy as it fits on the top rail of a crib.
Figure 3:
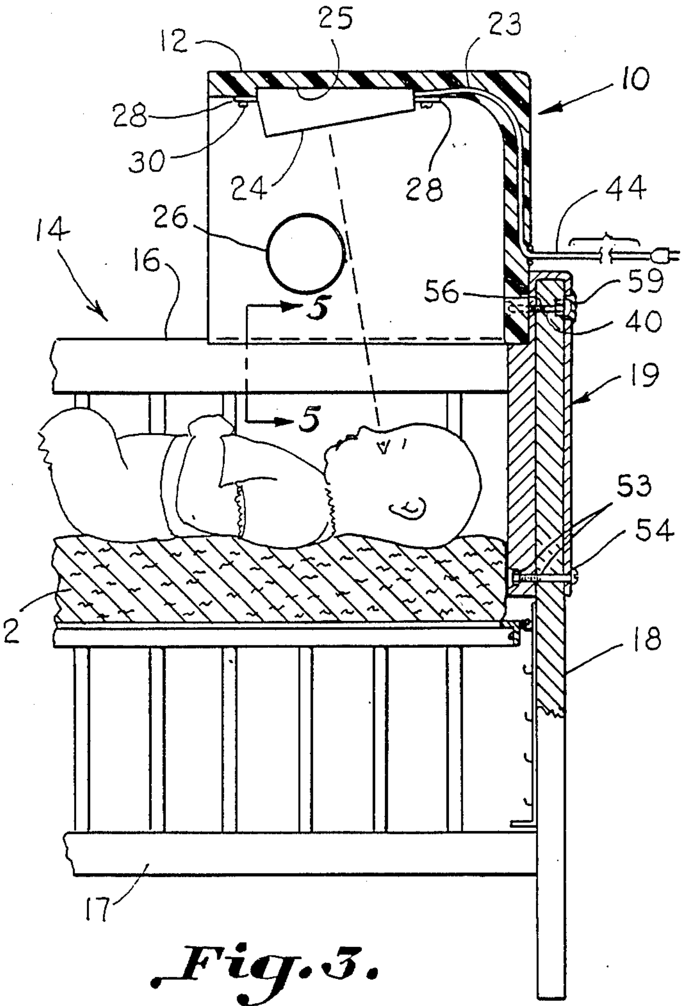
FIG. 3 is a sectional view taken along lines 3—3 of FIG. 2.
Figure 4:
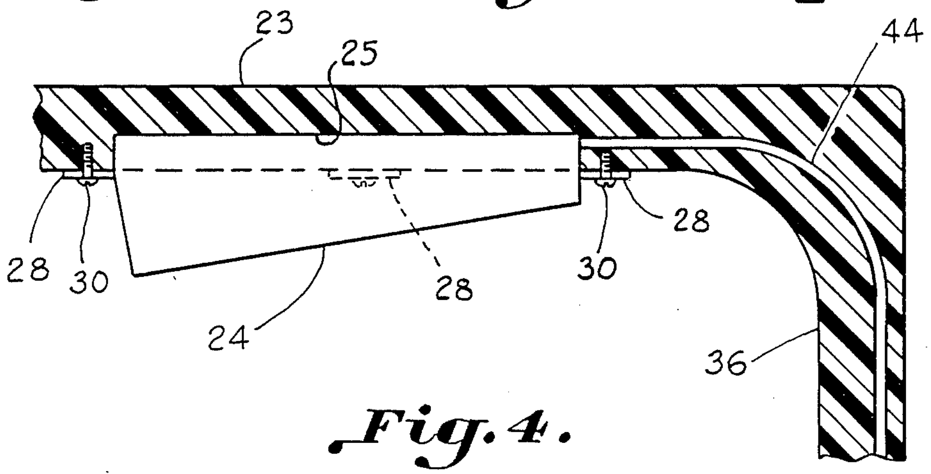
FIG. 4 is an enlarged side view of the device of the invention as seen in FIG. 3 and shows more details of the mounting of the visual display unit in the canopy.

Referring now to FIGS. 1, 2, 3, 4, 5, 6A and 6E wherein is illustrated the convertible audio-visual display center 10 which comprises a canopy 12 resting on a crib 14. Canopy 12 is supported by the top side rails 16 and on the head board 18 by an adapter designated generally as 19, which will be described in detail, below. The crib also includes side and bottom rails 17, foot board 20 and a mattress 22.

Canopy 12 comprises a top wall 23, an end wall 36, and first and second side walls 32 secured to opposing sides of at least one of walls 23, 36. Top wall 23 has a recess 25 into which is fitted a video display unit 24. The video display unit 24 is held within the recess 25 by means of brackets 28 and bolts or screws 30. As can best be seen in FIGS. 3 and 4, the top of video display unit 24 is disposed in the recess adjacent to end wall 36 when the canopy is in place on the crib. Furthermore, the screen of the video display unit is tilted so that the bottom of the screen is closer to the surface of mattress 22 than is the "top" of the screen. The reason for this being that the baby, when lying on mattress 22, will have a more comfortable view of the screen than it would have if the screen was flush with the surface of the top wall of the canopy.

In each side wall 32 of the canopy is disposed at least one speaker 26 for conveying sounds such as voices, music, or the like for the listening pleasure of the baby. Speakers 26 and video display unit 24 are connected to a video and/or audio source by means of a coaxial cable 44 or the like. The source to which the coaxial cable 44 or the speakers are connected may be a radio, stereo, television, video cassette recorder, or the like for generating the audio and/or video signals to be reproduced by the video display unit and/or the speakers.

Whenever canopy 12 is in position bridging the side rails 16 of the crib, it is supported by the side rails and the head board 18 through adapter 19. Each canopy side wall 32 terminates in a foot 34 at the bottom edge of said side walls which is adapted to receive the top surface of top rails 16 as can best be seen in FIG. 5. In addition, canopy end wall 36 terminates in an end portion which rests upon the adapter 19 supported by the upper part of the head board 18 as best seen in FIG. 6A. Canopy end wall 36 is held securely to head board 18 by means of a plurality of bolts 40 and nuts 42. Thus, when the canopy 12 is firmly attached to the crib there is no likelihood or possibility that the canopy would be dislodged or fall upon the baby.

Referring now more particularly to FIGS. 6A and 6B wherein adapter 19 is illustrated in perspective and in detail, adapter 19 has a U-shaped portion 50 having legs 50a and 50b which straddle headboard 18. On the mattress side of the headboard is a thickened portion 52 which extends between the mattress and the headboard and is held in place in contact with the headboard by means of bolts 54 which extend through openings 53 in both the headboard and the adapter. Nuts may be threaded on bolts 54 to securely hold the adapter in place against the headboard.

Near the upper end of the adapter 19 is a reduced portion 57 to form a ledge 55 which has a thickness equal to the thickness of the canopy end 36. When the canopy end is in place on ledge, on the bolts 40 extend through holes 56 into the wall of the end portion and securely bolt the canopy end to adapter 19. Access openings 58 are provided in the rear wall of portion 50a of the adapter to permit bolts 40 to be threaded into the canopy. Covers 59 are provided for filling the access openings once the adapter is firmly and securely bolted to the canopy end for sake of appearance.

The adapter 19, as described herein, may be formed of a rigid plastic or from steel. In either case, the surface of thickened portion 52 will be padded where it comes, or lies, adjacent to the head of the baby, in operation, so as to avoid harmful contact between the baby and the adapter.

Figure 7:
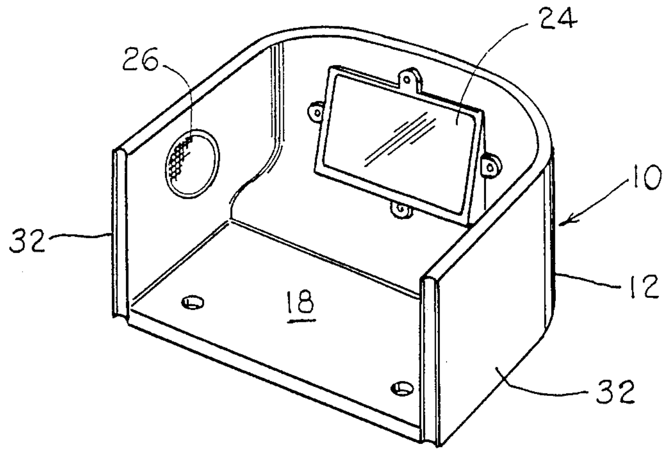
FIG. 7 is a perspective view of the video display unit for accommodating a keyboard of a personal computer with the canopy removed from the crib and supported on a table or desk.

When it is desired to convert the audio-visual display center 10 for use as a computer console or work station, the canopy 12 is disconnected from the crib and the adapter and it is placed onto a table top with the canopy end 36 in the horizontal plane and the canopy top wall 23 now in the vertical plane, as seen best in FIG. 7. When the conversion is made the video display unit 24 is loosened in its brackets 28 and bolts 30 and is reversed one hundred and eighty degrees (180°) with the top of the display unit now being adjacent to the open end of top of the canopy 12. A keyboard (not shown) for the computer may now be supported by end wall 18, which is now in the horizontal plane, and the keyboard may be attached to end 18 by suitable brackets or screws such as brackets 28 and bolts or screws 30. In this case, the cable 44 will be connected to the keyboard of the computer as desired and the video display unit 24 will now display the results of the operation of the computer.

Figure 8:
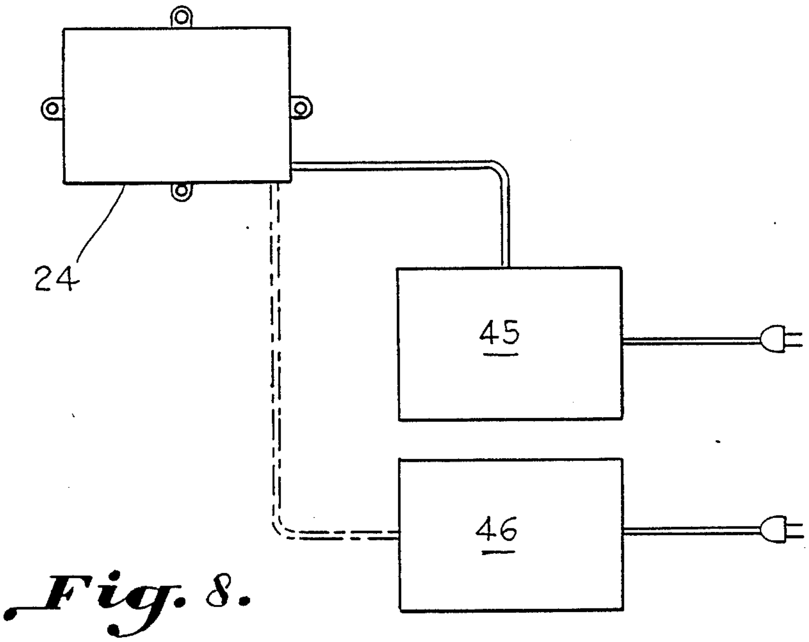
FIG. 8 is a diagrammatic view showing the video display unit alternately connected to a video source or to personal computer.

As seen in FIG. 8, the video display unit 24 may be connected alternately to either the video source 45 or to a computer console 46 depending on which mode of operation is desired at the time.

The video display unit 24 disclosed herein may be any state of the art video display units available in the market place. This may use a picture tube or a liquid display, as desired, and as required by space requirements, the selection of which lies within the scope of those skilled in the video art. The particular type of video display unit is not critical to the operation of the present invention.

The words used to describe this invention herein are words of description only and are not deemed to be limiting in nature. The scope of applicant's protection is to be measured only by the claims appended hereto.

It is also understood that the means for connecting the video display unit to the canopy may vary and that the coaxial cable may be replaced by other suitable connectors for conveying the electronic signals to the video display unit.

While a preferred embodiment of the invention has been described using specific terms, such description is for illustrative purposes only, and it is to be understood that changes and variations may be made without departing from the spirit or scope of the following claims.

What is claimed is:

1. A convertible audio-visual display center adapted to display video images in substantially vertical or horizontal planes when supported on a table or desk top or when supported above an infant's crib, comprising:

(a) a support member having at least two walls, extending in planes at substantially right angles to each other, and first and second side members connected to at least one of said walls at respective first and second sides of said one wall;

(b) a recess in one of said walls;

(c) a video display unit for displaying video images, disposed at least partially within said recess for proper viewing by an infant lying in said crib in a supine position;

(d) means for supporting said video display unit so that the top of said screen is closer to the plane of another of said two walls than is the bottom of said screen for proper viewing by an infant lying in said crib in a supine position; and (e) means for supporting said support member generally in either the vertical or the horizontal plane either above said crib or on the surface of a table or desk top.

2. A convertible audio-visual display center as set forth in claim 1, wherein the top of said screen lies closer to the vertical plane of said one wall when said support member is on a table top.

3. A convertible audio-visual display center as set forth in claim 1 wherein the top of said screen is closer to the horizontal plane of said one wall when said support member is supported above an infant's crib.

4. A convertible audio-visual display center as set forth in claim 1 wherein said video display unit is disposed within a recess in a horizontal surface of said support member and has the top of its screen adjacent to the point where the planes of said two walls intersect.

5. A convertible audio-visual display center as set forth in claim 1, wherein the side members of said support member are supported by the top rails of said crib.

6. A convertible audio-visual display center as set forth in claim 1, wherein said support member is firmly attached to the head end of an infant's crib.

7. A convertible audio-visual display center as set forth in claim 1, wherein audio reproduction means are located on the side members of said support member.

8. A convertible audio-visual display center as set forth in claim 1, wherein said one of said walls extends in a substantially vertical plane and the other of said two walls rests on a flat surface.

9. A convertible audio-visual display center as set forth in claim 8, wherein said wall supported on said surface supports a computer keyboard.

10. A convertible audio-visual display center as set forth in claim 9 wherein the "bottom" of the screen of said video display unit lies adjacent to the point where the planes of said two walls intersect.

11. A convertible audio-visual display center as set forth in claim 1, wherein said means for supporting said support member above a crib comprises an adapter interposed between said crib and said support member.

12. A convertible audio-visual display center as set forth in claim 11, wherein said adapter has a portion which engages two sides of the crib headboard and provides a mounting ledge to support said support member.

13. A convertible audio-visual display center adapted to display video images in substantially vertical or horizontal planes, comprising:

(a) a support member having a first wall extending in a first plane, a second wall extending in a second plane which intersects said first plane;
(b) a video display unit for reproducing and displaying video images carried by said first wall;
(c) bracket means for supporting said video display unit so that the top of images on said screen is closer to the plane of said second wall than is the bottom of said images for proper viewing by an infant in a supine position, and for supporting said video unit in a rotated position so that the top of said images is further away from said second wall for proper viewing by a person in a sitting position; and
(d) means for supporting said support member with said first wall in either a horizontal or a vertical position for viewing in said supine and sitting position, respectively.

14. A convertible audio-visual display center as set forth in claim 13, wherein the top of images on said screen are adjacent to the point where said first and second walls intersect, when said first wall is in a horizontal plane.

15. A convertible audio-visual display center as set forth in claim 13, wherein the bottom of the images on said screen is adjacent to the point where said first and second walls intersect when said first wall lies in a vertical plane.

16. A convertible audio-visual display center as set forth in claim 13, wherein audio reproduction means are located on the side members of said support member.

17. A convertible audio-visual display unit for an infant's crib comprising:

(a) a canopy device for bridging the sides of said crib adjacent one end thereof;
(b) said canopy device including:
 a pair of spaced side walls;
 a first wall means extending between said side walls;
 a second wall means integral with said first wall means and side walls; and
(c) said side walls and said first and second wall means defining a canopy interior;
(d) a visual display unit carried by said first wall means having a video screen for a visual display;
(e) audio means carried by at least one of said side walls for transmitting sounds;
(f) adapter means for supporting said canopy device above said crib with said video screen generally overhead of an infant in a supine position;
(g) said canopy device having a first visual display position when supported above said crib for viewing by said supine infant; and
(h) said canopy device having a second visual display position when removed from said crib with said second wall means based on a table top for viewing by a person sitting at said table top.

18. The apparatus of claim 17 including means for attaching said visual display unit to said first wall means in said first position in which said video screen is oriented at a first prescribed angle for proper viewing by said infant in said supine position and for orienting said visual display unit in said second position at a second prescribed angle for proper viewing by said person sitting at said table top.

19. The apparatus of claim 17 wherein said adapter means includes attachment means which comprises a sleeve having first and second legs for straddling said headboard of said infant's crib, and attachment means for fastening said sleeve to said headboard and for attaching said canopy device to said sleeve.

20. The apparatus of claim 19 wherein said sleeve further comprises a horizontal ledge which abuts an edge of said canopy device when fastened thereto for support.

21. The apparatus of claim 17 including a table defined by an interior surface of said second wall means between said side walls adapted for supporting a keyboard of an associated computer of which said video display screen is a monitor when said device is in said second position on said table top.

22. An audio-visual display unit for an infant's crib comprising:

(a) a canopy device for bridging the sides of said crib adjacent one end thereof;
(b) said canopy device including a generally vertical first wall means and a generally horizontal second wall means extending in intersection planes;
(c) a visual display unit carried by said first wall means having a video screen for proper viewing by an infant in a supine position in said crib with a top of the image on said video screen being closer to said second wall;
(d) audio means carried within an interior of said canopy device for transmitting sounds; and
(e) adapter means for supporting said canopy device above said crib with said video screen generally overhead of an infant in a supine position with a tip of the image on said video screen being closer to said second wall.

23. The apparatus of claim 22 including means for attaching said visual display unit to said first wall means so that said video screen is oriented at a first prescribed angle which intersects said first wall means for proper viewing by said infant in said supine position.

24. The apparatus of claim 22 wherein said adapter means includes an adapter attachment means which comprise a sleeve having first and second legs for straddling said headboard of said infant's crib, and carrying means for fastening said sleeve on said headboard and for attaching said canopy device to said sleeve.

25. The apparatus of claim 1 wherein said video display unit is carried by said first wall so that said video screen is in a plane inclined to the horizontal.

26. The apparatus of claim 13 wherein said video display unit is carried by said first wall so that said video screen is in a plane inclined to the horizontal.

* * * * *